(12) United States Patent
Spalding et al.

(10) Patent No.: US 11,433,625 B2
(45) Date of Patent: Sep. 6, 2022

(54) COMPOSITE WITH INFUSION FILM SYSTEMS AND METHODS

(71) Applicant: The Boeing Company, Chicago, IL (US)

(72) Inventors: John F. Spalding, Tukwila, WA (US); Kelsi M. Hays, Mill Creek, WA (US); Derek Huang, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 97 days.

(21) Appl. No.: 16/669,263

(22) Filed: Oct. 30, 2019

(65) Prior Publication Data

US 2021/0129455 A1 May 6, 2021

(51) Int. Cl.
*B29C 70/08* (2006.01)
*B29C 70/44* (2006.01)
*B29C 70/30* (2006.01)
*B29L 31/30* (2006.01)

(52) U.S. Cl.
CPC ............ *B29C 70/086* (2013.01); *B29C 70/30* (2013.01); *B29C 70/44* (2013.01); *B29L 2031/3076* (2013.01)

(58) Field of Classification Search
None
See application file for complete search history.

(56) References Cited

U.S. PATENT DOCUMENTS

| 5,196,457 | A | 3/1993 | Wilkinson et al. |
| 6,311,542 | B1 | 11/2001 | Sloman |
| 2005/0258575 | A1* | 11/2005 | Kruse ...................... D04C 3/48 264/512 |
| 2016/0083086 | A1 | 3/2016 | Stamps et al. |

OTHER PUBLICATIONS

European Application Serial No. 20194588.8, Search Report dated Feb. 12, 2021, 8 pgs.

* cited by examiner

*Primary Examiner* — Christopher T Schatz
(74) *Attorney, Agent, or Firm* — Kwan & Olynick LLP

(57) ABSTRACT

Described are methods and systems for a composite structure that allows for out of autoclave curing. Due to the layout of the composite structure, voids within the composite structure, formed out of autoclave, is reduced. The composite structure includes a composite laminate and one or more infusion films. The composite laminate includes a plurality of fiber tows that each include a plurality of fiber strands and a resin. The resin has a first viscosity within a first temperature range. The infusion film is disposed on a surface of the composite laminate and has a second viscosity lower than the first viscosity within the first temperature range. Methods of curing the composite structure are also described.

20 Claims, 12 Drawing Sheets

COMPOSITE WITH INFUSION FILM SYSTEMS AND METHODS

BACKGROUND

Fiber reinforced plastic (FRP) composite structures are traditionally cured using autoclaves. However, autoclaves are bulky, expensive, and costly and resource intensive to operate. Thus, it is desirable to develop structures that do not require autoclaves for curing. Unfortunately, composite structures that have been cured out of autoclave typically include an unacceptable level of porosity. Thus, composite structures continue to be cured in autoclaves due to the unacceptable porosity levels of out of autoclave cured structures.

SUMMARY

Described are methods and systems for a composite structure that includes an infusion film. During manufacture of the composite structure, the infusion film is disposed over the uncured composite laminate of the composite structure. The composite laminate can include a plurality of fiber tows that each includes a plurality of fiber strands and a resin that has a first viscosity within a first temperature range. The infusion film is disposed on a surface of the plurality of fiber tows and has a second viscosity that is lower than the first viscosity of the resin within the first temperature range and is configured to flow into the composite laminate when the infusion film is within the first temperature range. Thus, as the processing temperature of the composite structure increase, the infusion film flows into the composite laminate to fill voids within the composite laminate. As such, the infusion film decreases or eliminates the amount of voids within the composite laminate. The composite structure is then cured and solidified into a workpiece. The resulting composite structure is then incorporated as a structure in, for example, a vehicle such as an aircraft.

Illustrative, non-exclusive examples of inventive features according to present disclosure are described in following enumerated paragraphs. These and other examples are described further below with reference to figures.

BRIEF DESCRIPTION OF THE DRAWINGS

The disclosure may best be understood by reference to the following description taken in conjunction with the accompanying drawings, which illustrate various examples.

DETAILED DESCRIPTION

In the following description, numerous specific details are set forth in order to provide a thorough understanding of the presented concepts. The presented concepts may be practiced without some, or all, of these specific details. In other instances, well known process operations have not been described in detail to avoid unnecessarily obscuring the described concepts. While some concepts will be described with the specific examples, it will be understood that these examples are not intended to be limiting.

Introduction

Composite structures are increasingly utilized in structures such as vehicle structures. In such applications, voids within the composite structure lead to a decrease in structural strength and, thus, decrease the strength to weight ratio of the composite structure. As vehicles are increasingly weight sensitive, the decrease in strength to weight ratio of the composite structure leads to an undesirably heavier vehicle.

Composite structures continue to be cured using autoclaves as out of autoclave curing of composites results in voids within the composites and an unacceptable level of porosity. As such, composite structures for vehicles continue to require autoclave curing in order to meet strength targets. However, autoclaves are bulky, expensive, and costly and resource intensive to operate. Attempts to manufacture composite structures out of autoclave using traditional techniques has resulted in parts with large amounts of voids. Such parts are weaker and have a larger rejection rate due to higher levels of porosity. Higher rejection rates increase the cost of production.

Figure 1A:
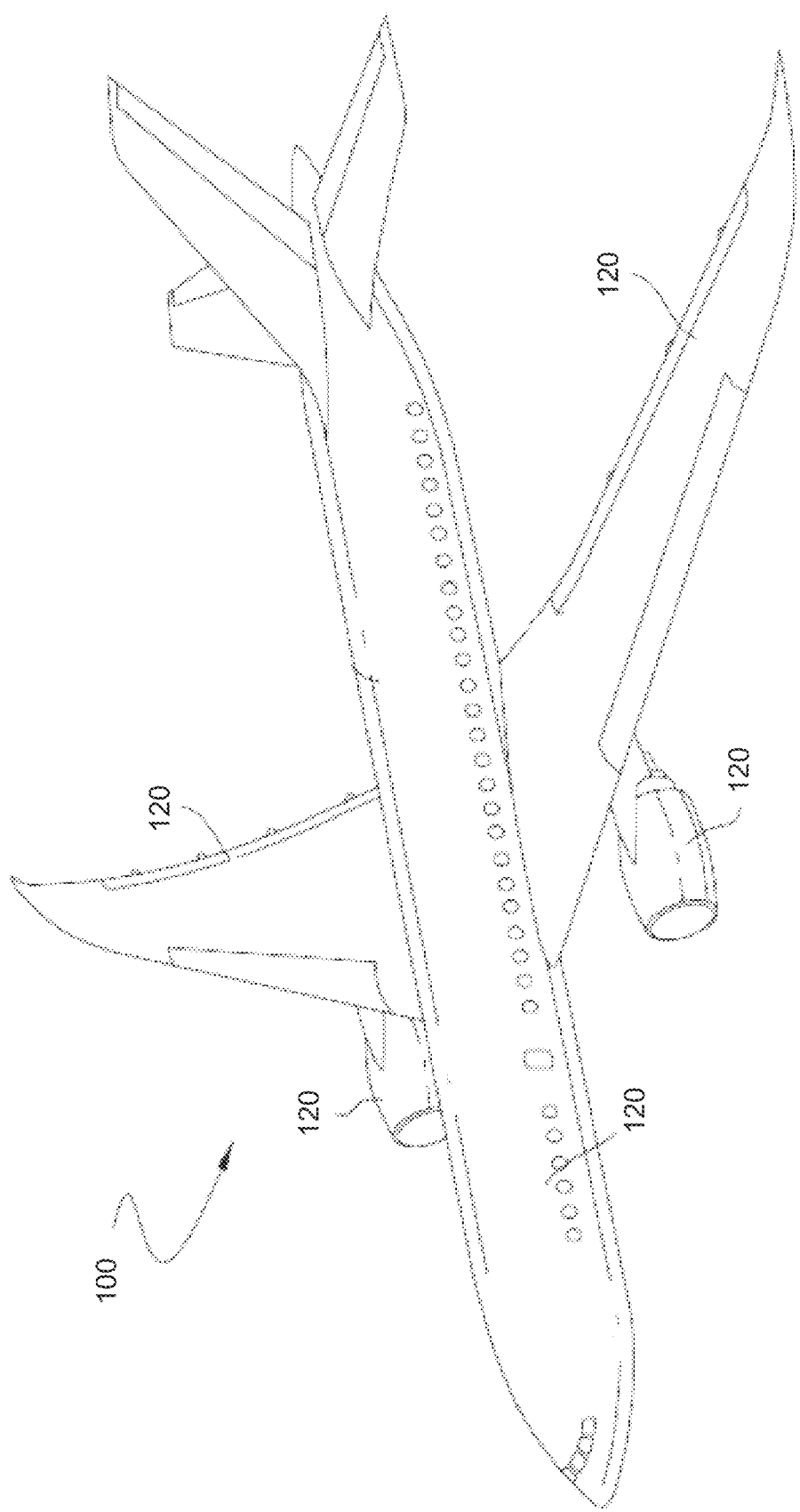
FIG. 1A illustrates a vehicle with composite structures, in accordance with some examples.

An example of a vehicle with a composite structure is shown in FIG. 1A. FIG. 1A illustrates a vehicle with composite structures, in accordance with some examples. FIG. 1A illustrates a vehicle 100 that is a fixed wing aircraft. In other examples, the systems and techniques described herein are used on other types of vehicles such as other types of aircraft (e.g., helicopters, spacecraft, rockets, and other aircraft), automobiles, ships, submarines, and other such vehicles or structures.

Vehicle 100 includes a plurality of vehicle structures 120. In various examples, vehicle structures 120 can be different portions of vehicle 100. For example, for the aircraft shown in FIG. 1A, vehicle structures 120 can be a fuselage, a wing (e.g., a fixed portion of the wing or a flap or other movable portion), an aircraft propulsor (e.g., a nacelle or inlet of the aircraft propulsor), an empennage, or another structure of the aircraft. Various examples of vehicle structures 120 can be made of fiber reinforced composites or composite laminates such as one or more of fiberglass, carbon fiber, Kevlar®, and other such composites.

Examples of Composite Laminates

Figure 1B:
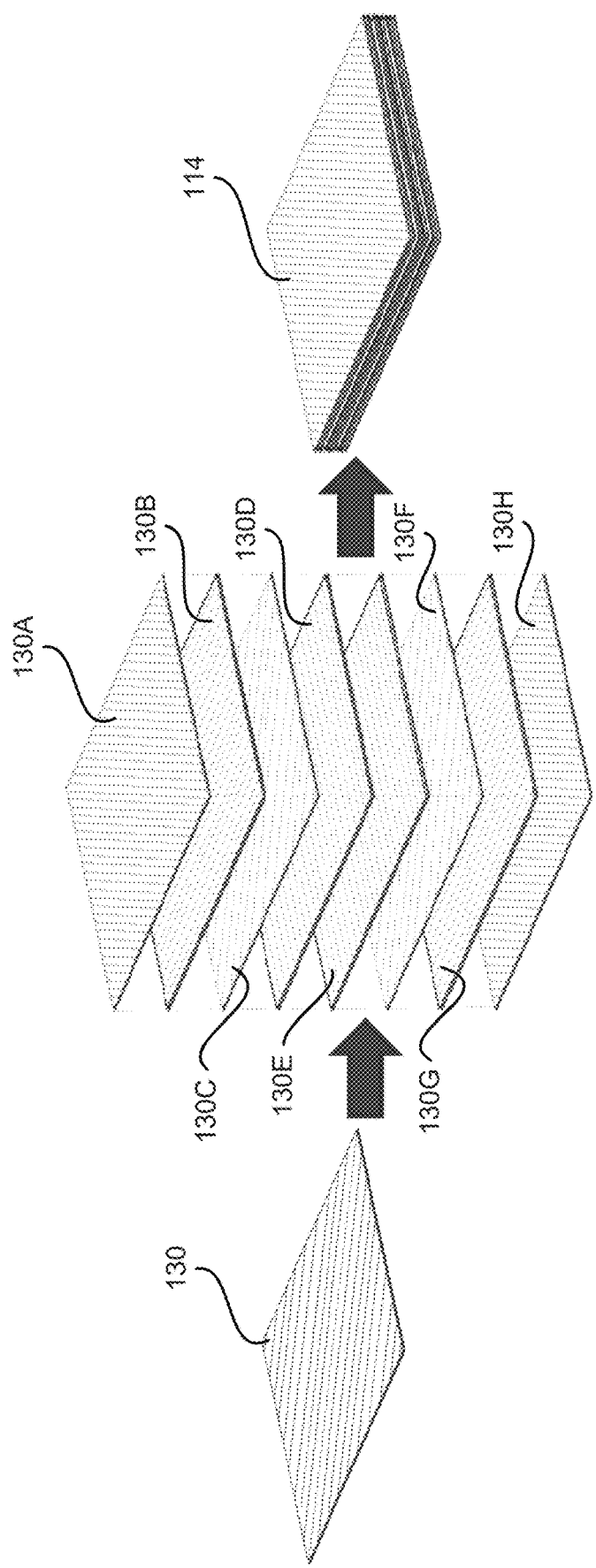
FIGS. 1B to 1E illustrate various aspects of composite laminates, in accordance with some examples.

FIGS. 1B to 1E illustrate various aspects of composite laminates, in accordance with some examples. FIG. 1B illustrates that composite laminate 114 includes a plurality of layers of composite plies 130A-H. As shown in the example of FIG. 1B, composite plies 130A-H include fiber tows oriented in directions different from each other. Such an orientation increases the strength of composite laminate 114 in various directions.

Figure 1D:
Figure 1E:
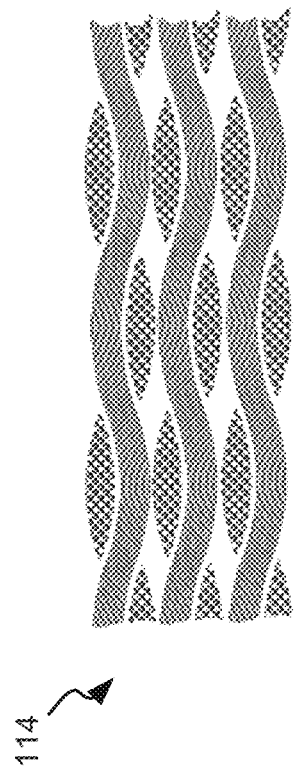
Figure 1C:
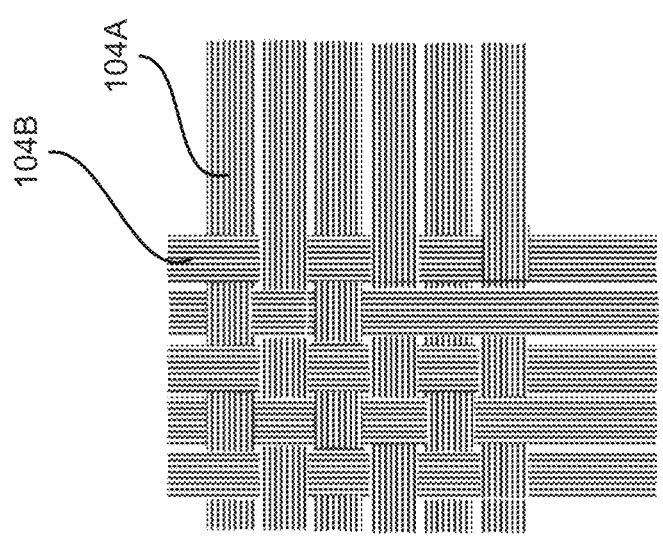

FIG. 1C illustrates a weave fabric of a composite laminate that includes fiber tows 104A, 104B, and other fiber tows. Fiber tows 104A and 104B are oriented in different directions. Orienting fiber tows 104As and 104B in different directions increases the strength of the composite laminate in various directions. Furthermore, FIG. 1D illustrates that fiber tows 104A and 104B are woven together. Additionally, FIG. 1E illustrates that a plurality of woven layers are stacked together to form composite laminate 114. Thus, composite laminate 114 includes a plurality of woven layers.

FIG. 1B illustrates a composite laminate fabricated with unidirectional tape plies while FIGS. 1C to 1F illustrate examples of individual fabric plies. Tapes include a majority of fibers running in one direction, while fabrics include a majority of fibers running in two different directions. It is appreciated that, in additional examples, the techniques described herein are applicable to tapes, fabrics, or other composites. Such tapes, fabrics, and other composites include resin applied on an outside portion and a dry center portion, as described herein.

Examples of Infusion Film Composite Structures

Figure 2A:
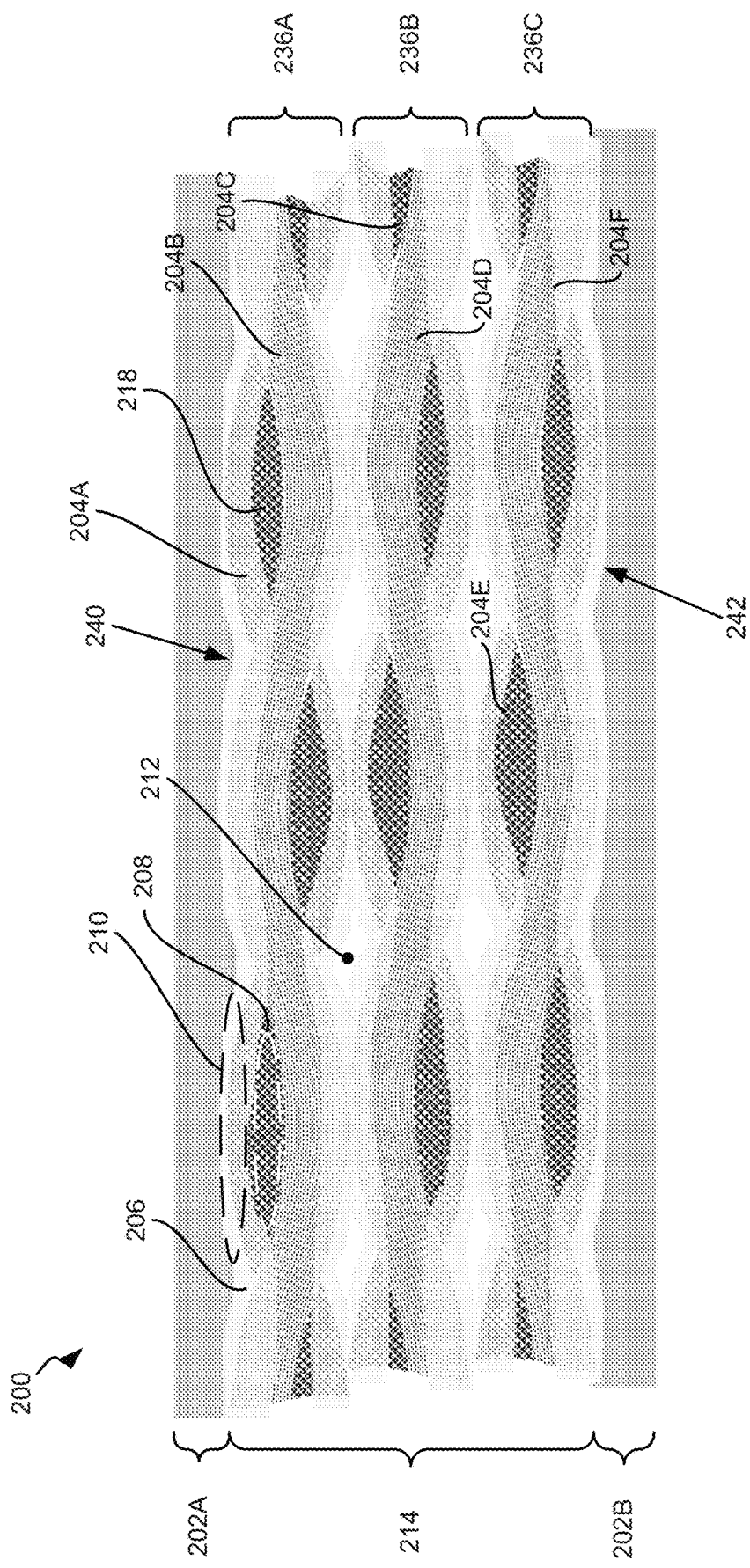
FIG. 2A illustrates a cross-sectional representation of a pre-cured infusion film composite structure, in accordance with some examples.
Figure 2B:
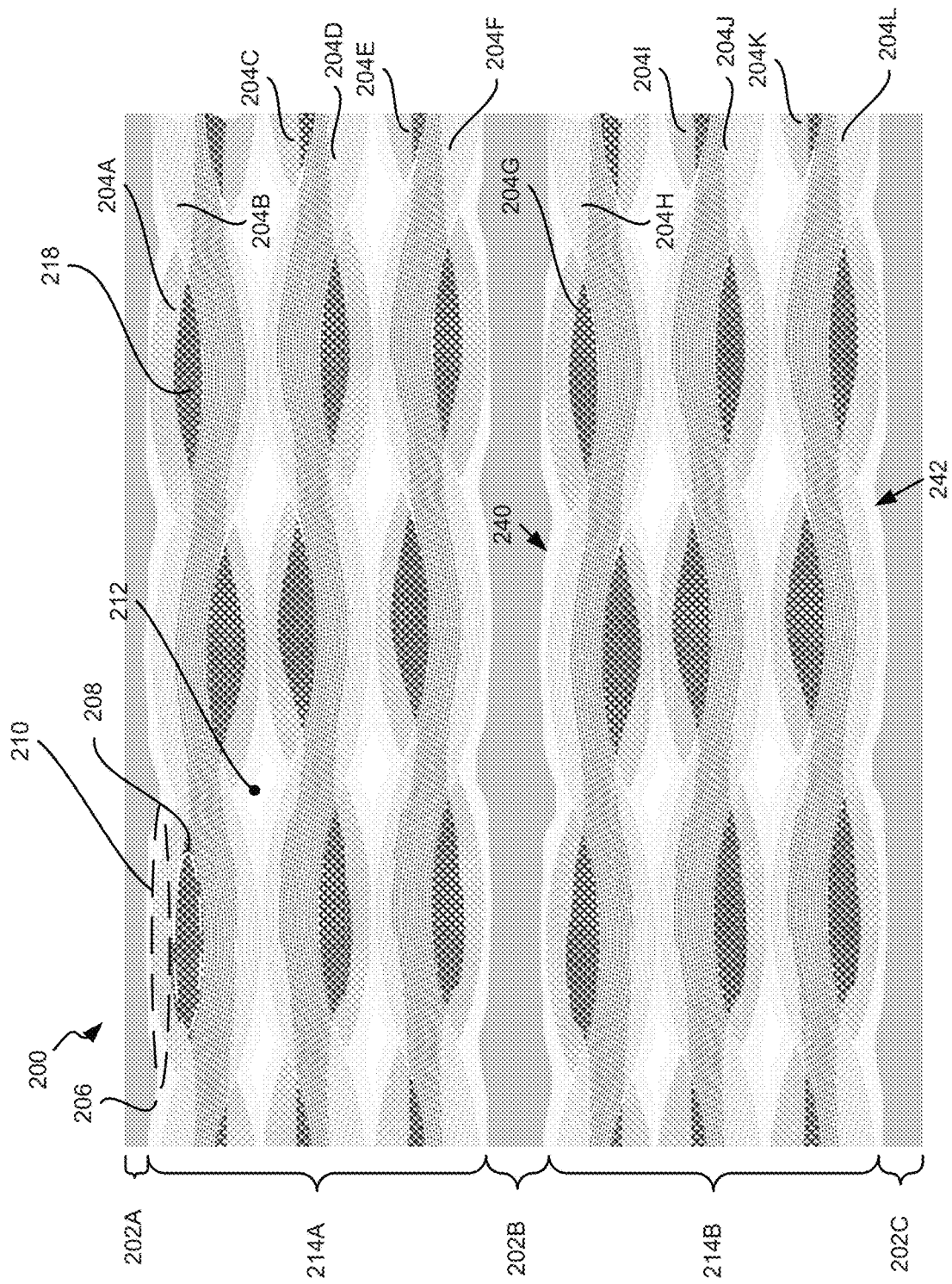
FIG. 2B illustrates a cross-sectional representation of another pre-cured infusion film composite structure, in accordance with some examples.

FIGS. 2A and 2B illustrate examples of pre-cured infusion film composite structure 200. FIG. 2A illustrates a cross-sectional representation of a pre-cured infusion film composite structure, in accordance with some examples. FIG. 2A illustrates a composite structure 200 for use within composite structures such as vehicle structures 120 described herein. In various examples, composite structure 200 is formed through the use of an out of autoclave forming process. In certain such examples, composite structure 200 is formed in a vacuum bagged process that does not include an autoclave.

Composite structure 200 includes composite laminate 214 and infusion films 202A and 202B. Composite laminate 214 includes first laminate surface 240 and second laminate surface 242. While the example of FIG. 2A includes infusion film 202A disposed on first laminate surface 240 and infusion film 202B disposed on second laminate surface 242, other examples of composite structures include infusion films disposed on various different surfaces (e.g., surfaces on the front, rear, top, bottom, and lateral portions) of the composite structure.

Composite laminate 214 includes a plurality of composite plies 236A-C. Each of composite plies 236A-C include a plurality of fiber tows (e.g., fiber tows 204A and 204B for composite ply 236A, fiber tows 204C and 204D for composite ply 236B, and fiber tows 204E and 204F for composite ply 236C). Each of fiber tows 204A-F includes a plurality of composite fiber strands, as described herein (e.g., woven together to create a single composite laminate).

In the example shown, composite plies 236A-C are stacked on top of each other and, thus, fiber tows 204A-F are disposed between first laminate surface 240 and second laminate surface 242. Fiber tows 204A-F are disposed next to one another and are stacked in certain arrangements such as, as shown in FIG. 2A, an arrangement where the fiber tows of each composite ply are wound around each other. Other examples include arrangements of composite plies and/or fiber tows in other arrangements.

Voids 212 are disposed between as well as within fiber tows 204A-F and are examples of voids that are, in certain conditions, filled by infusion films 202A and 202B. Voids 212 are, in certain examples, open areas between fiber tows 204A-F and/or areas within honeycomb structures or other components of composite structure 200. Other examples orient the plurality of fiber tows in other arrangements and includes voids in other areas.

Fiber tow 204A is herein used as an example to illustrate features of fiber tows 204A-F. Fiber tow 204A includes a plurality of fiber strands 218 and resin 206. In certain examples, fiber strands 218 are fiber reinforced composite fiber strands (e.g., carbon fiber, fiberglass, Kevlar®, or other such composites). Fiber tow 204A includes first portion 210 and second portion 208.

In the example shown in FIG. 2A, an example where composite structure 200 has not yet been cured, resin 206 is disposed within first portion 210, but is not disposed within second portion 208. Thus fiber tow 204A is a pre-impregnated or partially pre-impregnated composite. When uncured, fiber tow 204A is partially impregnated where the portion of fiber tow 204A contained within first portion 210 is impregnated with resin 206 while the portion of fiber tow 204A contained within second portion 208 is un-impregnated (e.g., dry or free of resin 206).

In certain examples, resin 206 has a first viscosity within a first temperature range and a viscosity lower than the first viscosity during a second temperature range. In certain examples, the second temperature range is greater than the first temperature range. During cure, when in the second temperature range, resin 206 on the impregnated portion of fiber tow 204A (e.g., within first portion 210) is configured to migrate into the un-impregnated portion of fiber tow 204A (e.g., into second portion 208) and/or the un-impregnated portions of other fiber tows.

Accordingly, the dry fiber strands within second portion 208 provide an evacuation path through which any entrapped air can be extracted during cure or pre-cure (e.g., pre-cure performed by a vacuum debulk process). As such, resin 206 is configured to flow, when in the low viscosity phase, into second portion 208 and infill the dry fiber tows to fill all the interstitial voids between the tows, forming a porosity free composite laminate 214.

Figure 5A:
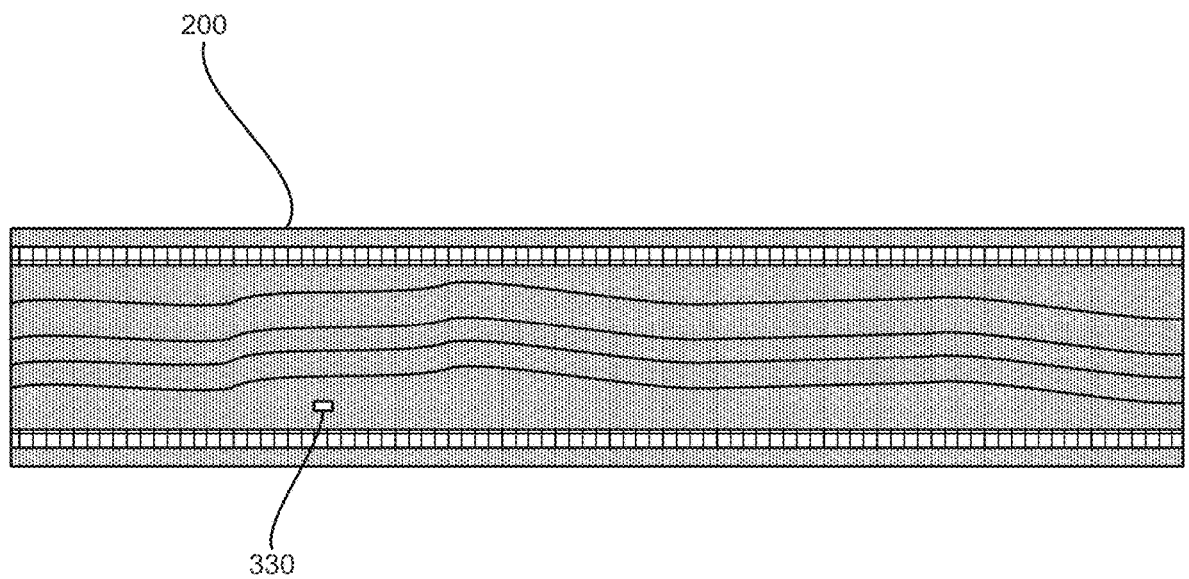
FIG. 5A illustrates a cross-sectional representation of a cured infusion film composite structure, in accordance with some examples.
Figure 5B:
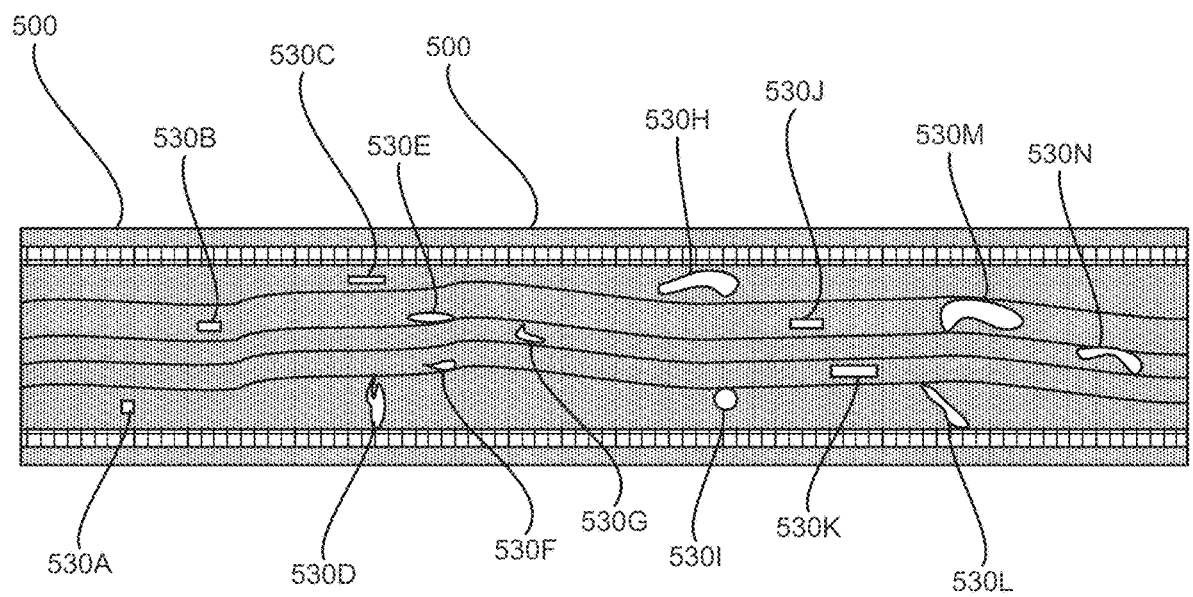
FIG. 5B illustrates a cross-sectional representation of another composite structure, in accordance with some examples.

However, in practice, such cured composite laminates, when cured out of autoclave, contain voids in the areas around the fiber tows (e.g., as shown and described in FIG. 5B). The presence of these voids is the result of the one atmosphere of pressure resulting from vacuum bagging being insufficient in forcing resin 206 of, for example, fiber tow 204A to flow and fully fill the dry second portion 208.

To fill such voids, the example of FIG. 2A disposes infusion films 202A and 202B on first laminate surface 240 and second laminate surface 242 of composite laminate 214. In various examples, infusion films 202A and 202B are another epoxy resin different from resin 206. The material of infusion films 202A and 202B has a second viscosity that is lower than the first viscosity of the resin 206 within the first temperature range and a flow profile that is configured to allow infusion films 202A and 202B to flow into voids 212 of composite laminate 214. Accordingly, within the first temperature range, infusion films 202A and 202B are configured to flow into composite laminate 214.

In the example of FIG. 2A, infusion films 202A and 202B are configured to operate along the Z-axis (e.g., up and down) of composite structure 200. Disposing infusion films 202A and 202B to operate along the Z-axis means that the length and width of composite structure 200 do not reduce the effectiveness and performance of the infusion films 202A and 202B. Such characteristics are unlike that of conventional processes reliant on edge breathing, which require that air must travel down the entire length of the fibers and, thus, are very length dependent. Furthermore, as displacement of voids 212 by infusion films 202A and 202B are not length dependent and not reliant on edge breathing, infusion films 202A and 202B would still flow into voids 212 of fibers that do not extend to the edge of composite laminate 214. Under conventional processes utilizing edge breathing, such fibers would have more difficulty allowing air to escape. Other examples include infusion films that operate, alternatively or additionally, along other axes.

As infusion films 202A and 202B are configured to operate along the Z-axis, infusion films 202A and 202B allow for edge breathing without any additional considerations. That is, disposing infusion films 202A and 202B on first laminate surface 240 and second laminate surface 242 allows for fiber tows 204A to breathe during cure and, thus, allows for resin 206 to still be able to displace air within the fiber tows (e.g., within second portion 208 of fiber tow 204A) during cure without any special considerations. As such, no trimming of the edges of composite laminate 214 nor any edge dams, edge breathers, and/or extended pre-cure debulk procedures are required to promote edge breathing of fiber tows 204A.

Figure 3A:
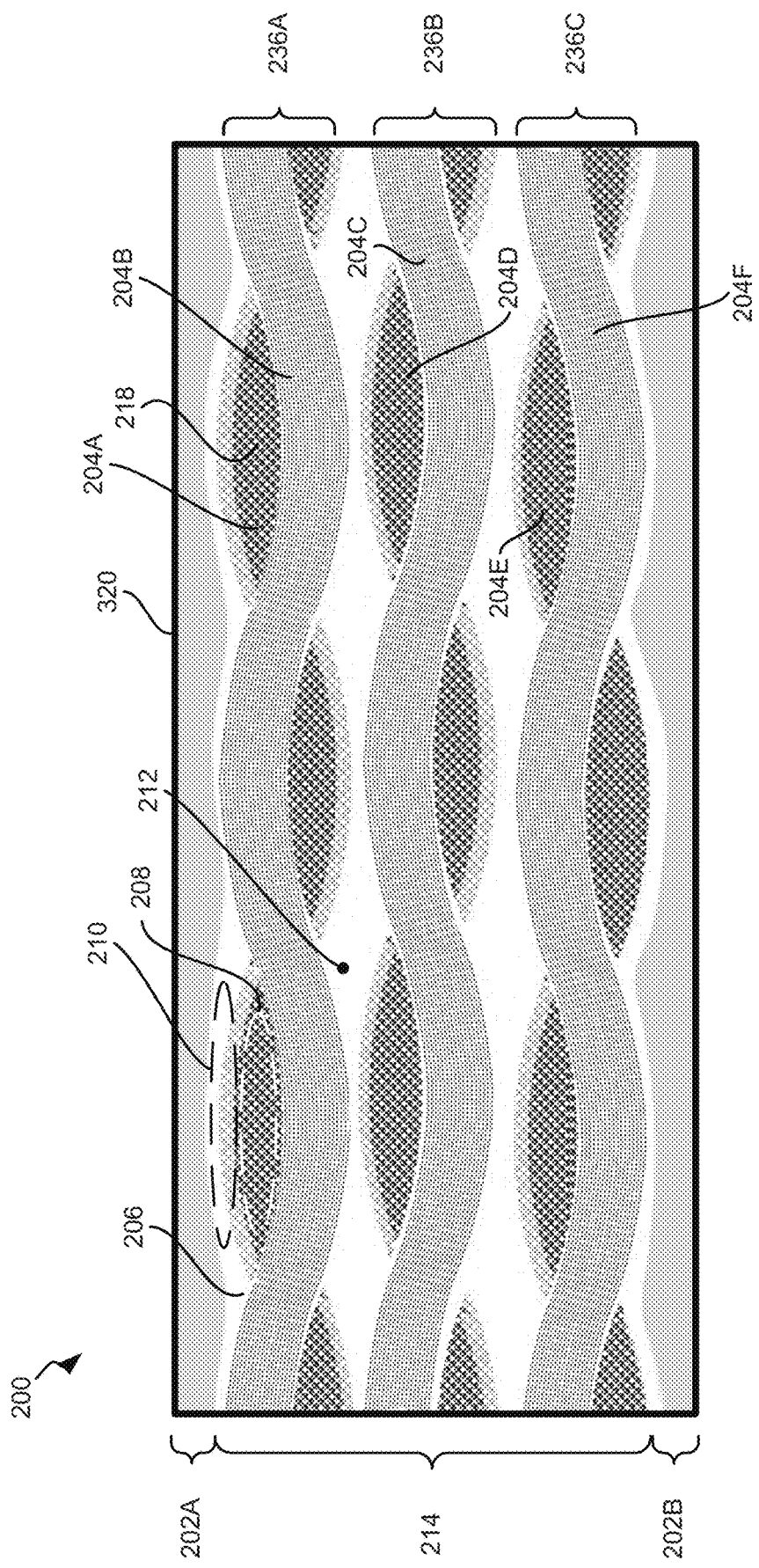
FIGS. 3A and 3B illustrate cross-sectional representations of the infusion film composite structure of FIG. 2A in various stages of processing, in accordance with some examples.
Figure 3B:
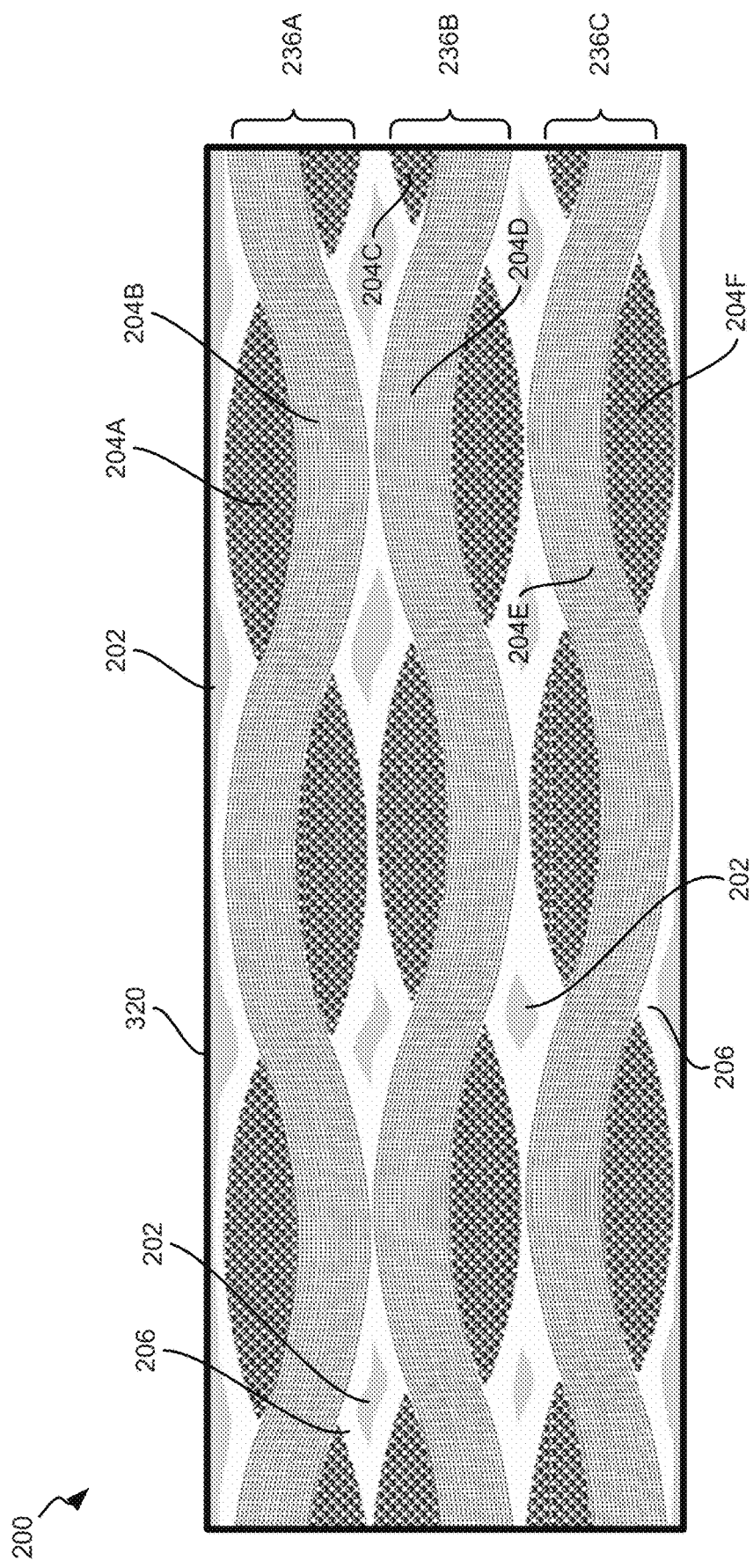

Forming of composite structure 200 using infusion films 202A and 202B, as shown in FIG. 2A, are described in further detail in FIGS. 3A and 3B. FIGS. 3A and 3B illustrate cross-sectional representations of the infusion film composite structure of FIG. 2A in various stages of processing, in accordance with some examples.

As shown in FIG. 3A, composite structure 200 is disposed within vacuum bag 320 during cure. During cure of composite structure 200, as the temperature increases to the first temperature range, infusion films 202A and 202B decrease in viscosity (e.g., are lower in viscosity than at room temperature) and may become viscous or liquid. As composite structure 200 is disposed within vacuum bag 320, atmospheric pressure acting on vacuum bag 320 imparts pressure on the low viscosity (e.g., liquefied) infusion films 202A and 202B through vacuum bag 320 pressing on composite structure 200 and, thus, infusion films 202A and 202B disposed on top of composite laminate 214. Based on the temperature being within the first temperature range and/or the atmospheric pressure acting on vacuum bag 320, infusion films 202A and 202B begin to penetrate composite laminate 214 and flow into composite laminate 214. In certain situations, infusion films 202A and 202B flow into or compact voids 212 of composite laminate 214.

Infusion films 202A and 202B continue to flow into composite laminate 214 and, at a certain point, fully fills voids 212 around fiber tows 204A-F. FIG. 3B illustrates a period when composite structure 200 is heated to the second temperature range. By the time of the example shown in FIG. 3B, composite structure 200 is in the second temperature range. In the second temperature range, resin 206 decreases in viscosity (e.g., a lower viscosity than at room temperature), may become viscous or liquid, and infills the previously dry second portions 208 of the fiber tows 204A-F, displacing air within second portions 208. The migration of resin 206 towards second portions 208 creates a negative pressure. This negative pressure further draws infusion films 202A and 202B into voids 212, including drawing infusion films 202A and 202B into additional voids created by the migration of resin 206 towards second portions 208 as well as into portions of fiber tows 204A-F. As such, any voids 212 that would have been present are filled with infusion film 202A and 202B and, thus, a consistent strong epoxy resin is present through composite structure 200.

Accordingly, as shown in FIG. 3B, fiber tows 204A-F have been fully filled with resin 206, as indicated by their uniform grey shading in FIG. 3B. Various fiber tows 204A-F are connected to neighboring fiber tows through resin 206. However, such connections are not uniform and would have resulted in voids. Such voids are filled with infusion film 202 to create a void free or mostly void free composite structure 200.

As one atmosphere of pressure is sufficient to cause infusion films 202A and 202B to fill voids 212 of composite laminate 214, composite structure 200 is suitable for out of autoclave forming. Composite structure 200 described in FIGS. 2A, 3A, and 3B is one example of a composite structure utilizing an infusion film to fill voids in an out of autoclave process. FIG. 2B illustrates a cross-sectional representation of another pre-cured infusion film composite structure, in accordance with some examples.

FIG. 2B illustrates another example of composite structure 200. Composite structure 200 of FIG. 2B includes a plurality of composite laminates 214A and 214B and a plurality of infusion films 202A, 202B, and 202C. Composite laminate 214A includes fiber tows 204A-F and composite laminate 214B includes fiber tows 204G-L. Fiber tows 204A-L of FIG. 2B are similar to that described in FIG. 2A.

Composite laminates 214A and 214B each include a first laminate surface and a second laminate surface. For example, composite laminate 214B includes first laminate surface 240 and second laminate surface 242. Infusion film 202A is disposed on top of composite laminate 214A, infusion film 202B is disposed between composite laminates 214A and 214B, and infusion film 202C is disposed on second laminate surface 242 of composite laminate 214B. Thus, in FIG. 2B, the arrangement of infusion films 202A, 202B, and 202C differs from that of FIG. 2A. It is appreciated that other examples include other arrangements of infusion films and composite laminates, including, for example, infusion films disposed on the top and bottom and/or in between layers of composite laminates. Such other arrangements are used depending on the thickness of the layers of the composite laminates (e.g., to promote effective flow of infusion films into the various layers of the composite laminates). Such various arrangements are used depending on the thickness of the composite laminates, number of layers of composite laminate, viscosity of the infusion films, and/or other such factors that affect the flow of the infusion film into the composite laminate.

In further examples, a single composite structure includes a plurality of infusion films that are made of different resins with different viscosity characteristics. Furthermore, in certain examples with a plurality of infusion films, various infusion films of the composite structure are of varying thicknesses. In certain such examples, such thicknesses depend on one or more of the viscosity characteristics of the resin (e.g., the thickness of the infusion film is matched to the viscosity of the resin to promote full penetration of any composite laminates), the number of plies the resin of the infusion film needs to flow through (e.g., the volume of material that the resin needs to flow through), and/or the acceptability of how much of the infusion film can remain on outer surfaces of the composite structure after cure. Furthermore, in certain examples, infusion films are placed only in certain locations of the composite structure where porosity is known to be a problem, rather than over the entire part or as a complete layer within the part. Accordingly, various examples dispose infusion films of different dimensions, resin characteristics, thicknesses, and in various locations.

Figure 2E:
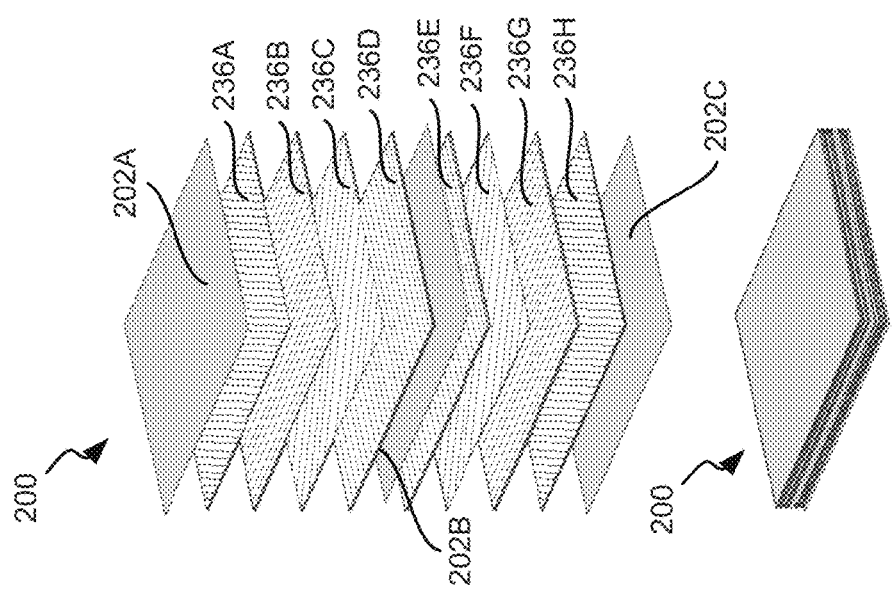
FIGS. 2C, 2D, and 2E illustrate various examples of pre-cured infusion film composite structures, in accordance with some examples.
Figure 2D:
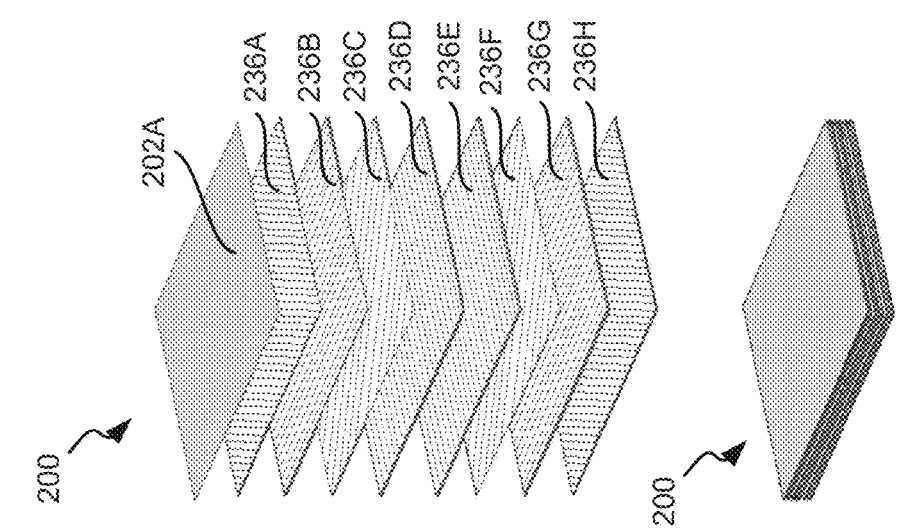
Figure 2C:
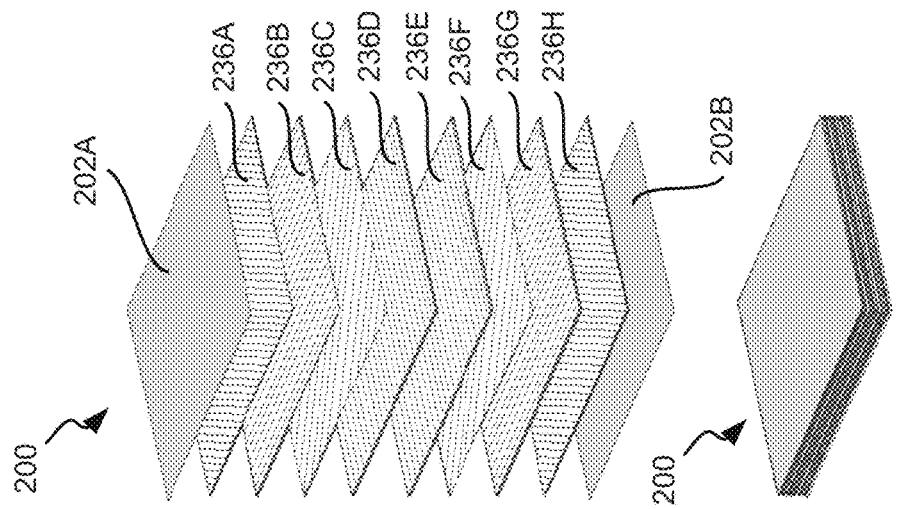

Other configurations of composite structures are also possible. FIGS. 2C, 2D, and 2E illustrate various examples of pre-cured infusion film composite structures, in accordance with some examples. FIGS. 2C, 2D, and 2E illustrate exploded and profile views of various examples of composite structure 200. As shown in FIGS. 2C, 2D, and 2E, composite structure 200 includes a plurality of composite plies 236A-H, with one or more composite plies 236A-H including fiber tows that are woven in directions different from each other. Other examples of composite structures will include any number of quantities and/or layouts of composite laminates.

As shown in FIGS. 2C, 2D, and 2E, infusion films are disposed in various sections of various examples of composite structures 200. Thus, in FIG. 2C, infusion films 202A and 202B are disposed on the outside of the composite laminates. Accordingly, infusion films 202A and 202B sandwich the various composite plies 236A-H. In FIG. 2D, composite structure 200 has a single infusion film 202A layer. In FIG. 2E, infusion films 202A and 202C are disposed on the outside composite laminate and, thus, on the outside of composite plies 236A-H while infusion film 202B is disposed between composite plies 236D and 236E. Accordingly, composite structure 200 described herein include a plurality of composite plies and/or infusion films.

Examples of Method for Composite Structure Forming with Infusion Film

Figure 4:
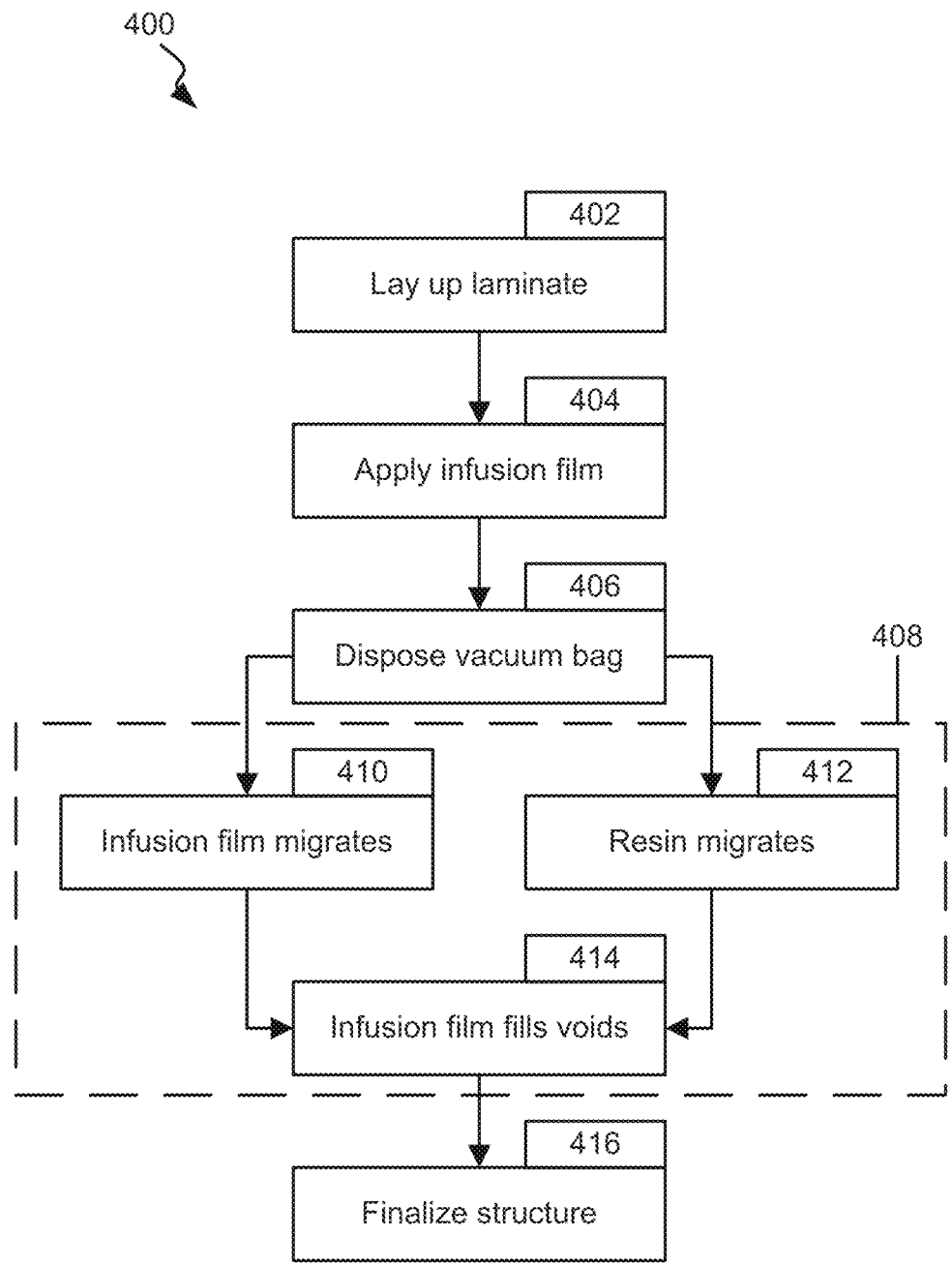
FIG. 4 is a process flowchart corresponding to a method of composite structure forming, in accordance with some examples.

FIG. 4 is a process flowchart corresponding to a method of composite structure forming, in accordance with some examples. Various operations of method 400 of FIG. 4 are executed using systems and apparatuses described herein.

In step 402, composite laminate 214 is laid up. In certain examples, composite laminate 214 includes a plurality of fiber tows 204 and laying up composite laminate 214 includes laying and/or positioning the plurality of fiber tows 204. In certain examples, fiber tows 204 are pre-impregnated or partially pre-impregnated fiber tows, but other examples can additionally or alternatively include hand laid up fiber tows.

In step 404, infusion films 202 is applied to composite laminate 214 to form an initial, pre-cured, version of composite structure 200. Infusion film 202 is disposed to one or more surfaces of composite laminate 214. In various examples, infusion film 202 is applied through various techniques appropriate for applying resins films onto laminates.

In step 406, composite structure 200 is disposed within vacuum bag 320. Composite structure 200 then proceeds through the curing process in steps 408 to 414 which, in certain examples, is performed out of autoclave.

As described herein, a vacuum is created within vacuum bag 320 to create a vacuum environment around composite structure 200 and composite structure 200 is heated (e.g., due to a heated vacuum bag or other heat sources contacting or disposed around vacuum bag 320 and heating vacuum bag 320) in step 408. The vacuum creation and heating of step 408 encompasses steps 410 to 414. Atmospheric pressure from the environment around vacuum bag 320 thus imparts a pressure on vacuum bag 320 and, thus, composite structure 200 (e.g., infusion film 202).

In certain examples, composite structure 200 is first heated to the first temperature range described herein (e.g., a temperature range of between 200 to 300 degrees Fahrenheit), which is lower than the second temperature range (e.g., a temperature range of between 300 to 400 degrees Fahrenheit). In the first temperature, infusion film 202 migrates into composite laminate 214 in step 410. In step 412, when in the first temperature range, in certain examples, resin 206 starts to migrate towards second portions 208 of fiber tows, but in other examples, resin 206 only migrates towards second portions 208 when composite structure 200 is heated to the second temperature range.

In step 414, as infusion film 202 migrates into composite laminate 214 due to positive pressure from vacuum bag 320 and/or as resin 206 migrates towards second portions 208 (thus creating a negative pressure that pulls infusion film 202 into composite laminate 214) infusion film 202 flows into voids 212 of composite laminate 214. Thus, infusion film 202 fills voids that would otherwise reduce the strength of composite laminate 214.

After composite structure 200 has been formed with voids 212 filled by infusion film 202, composite structure 200 is finalized in step 416. Finalization of composite structure 200 includes, in various examples, final curing, post processing (e.g., trimming), or finishing (e.g., coating) of composite structure 200.

Examples of Void Frequency Within Composite Structures

FIG. 5A illustrates a cross-sectional representation of a cured infusion film composite structure, in accordance with some examples. Composite structure 200 is formed and cured according to the techniques described herein. Composite structure 200 includes void 330, but is otherwise free of voids.

FIG. 5B illustrates a cross-sectional representation of another composite structure, in accordance with some examples. Composite structure 500 of FIG. 5B is formed without an infusion film. As shown in FIG. 5B, composite structure 500 includes a plurality of voids 530A-N. The number of voids within composite structure 500 is significantly higher than the number of voids within composite structure 200. Furthermore, some such voids are larger in size than void 330 of composite structure 200.

The examples of FIGS. 5A and 5B are abstract representations based on actual test results. The actual test results show that composite structures without the infusion film has a significant amount of voids when cured. In the actual results, the composite structure with the infusion film had a porosity level of 0.36% while the composite structure without the infusion film had a porosity level of 2.72%. Both composite structures were formed with out of autoclave processes, though the example of FIG. 5A was formed with a simpler and, thus, more cost effective out of autoclave process that did not require any edge dams, edge trimming, or pre-cure vacuum dwell. The example of FIG. 5B was fabricated with a process that includes such edge dams, edge trimming, and pre-cure vacuum dwell to aid the extraction of air out of the fiber tows.

The low porosity of the composite structure with the infusion film allows for utilization of out of autoclave forming, which significantly reduces cost due to the elimination of the costly autoclave. Furthermore, autoclaves exert significant pressure on composite structures and, thus, require core crush prevention structures to avoid crushing honeycomb. The much lower (one atmosphere) of pressure exerted with an out of autoclave process does not require core crush prevention structures, further reducing cost.

Vehicle Examples

While the systems, apparatus, and methods disclosed above have been described with reference to airplanes and the aerospace industry, it will be appreciated that the examples disclosed herein is applicable to other contexts as well, such as automotive, railroad, and other mechanical and vehicular contexts. Accordingly, examples of the disclosure is described in the context of an airplane manufacturing and service method 600 as shown in FIG. 6A and vehicle 100 as shown in FIG. 6B in applicable to such other contexts.

Figure 6A:
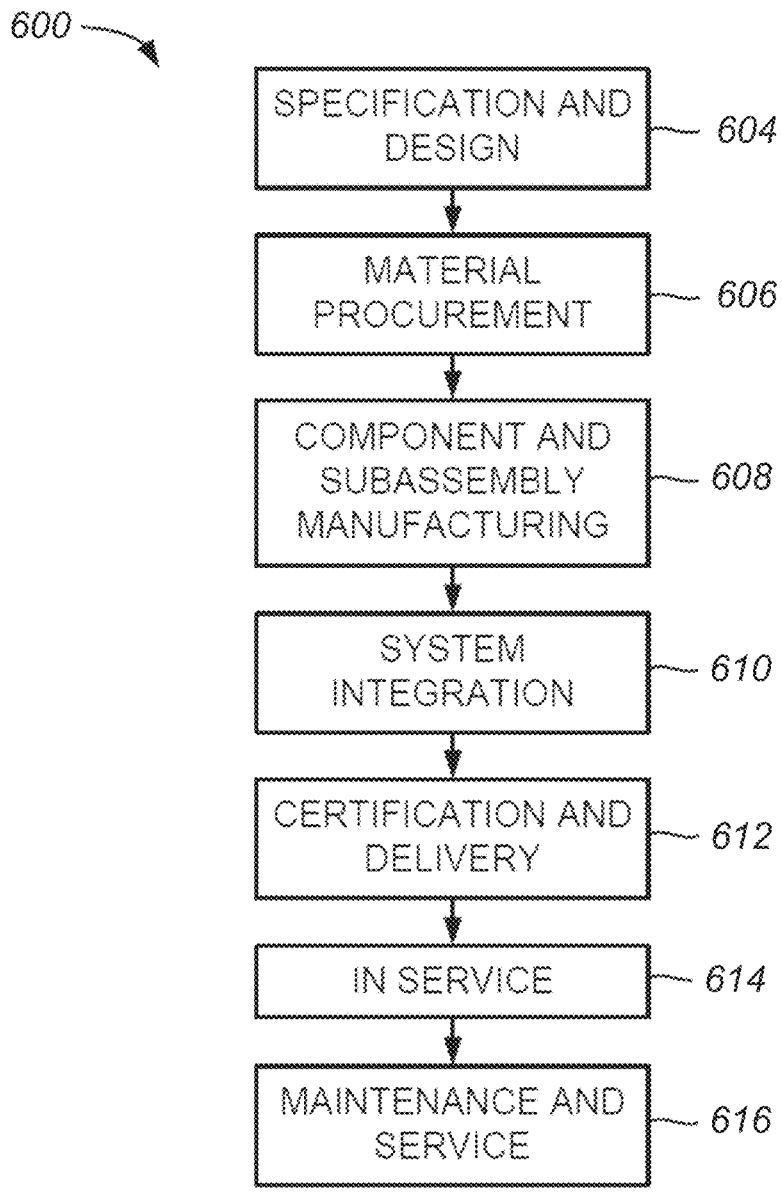
FIG. 6A illustrates a flow chart of an example of an aircraft production and service methodology, in accordance with some examples.

FIG. 6A illustrates a flow chart of an example of a vehicle production and service methodology, in accordance with some examples. In some examples, during pre-production, method 600 includes the specification and design 604 of vehicle 100 (e.g., an aircraft as shown in FIG. 1A) and material procurement 606. During production, component and subassembly manufacturing 608 and system integration 610 of vehicle 100 takes place. Thereafter, vehicle 100 goes through certification and delivery 612 in order to be placed in service 614. While in service by a customer, the vehicle 100 is scheduled for routine maintenance and service 616 (e.g., modification, reconfiguration, refurbishment, and so on).

In certain examples, each of the processes of method 600 is performed or carried out by a system integrator, a third party, and/or an operator (e.g., a customer). For the purposes of this description, a system integrator includes any number of airplane manufacturers and major-system subcontractors; a third party includes any number of venders, subcontractors, and suppliers; and an operator can be an airline, leasing company, military entity, service organization, and so on.

Figure 6B:
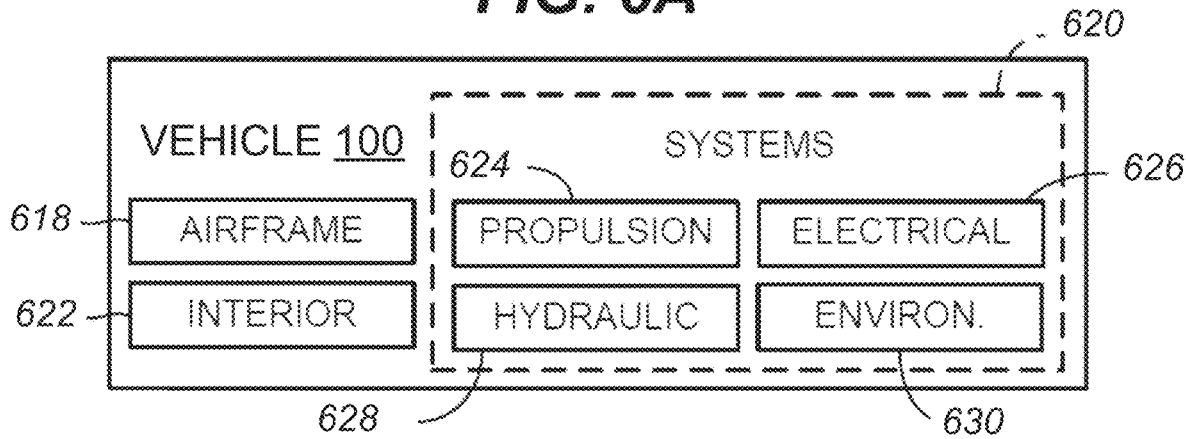
FIG. 6B illustrates a block diagram of an example of a vehicle, in accordance with some examples.

FIG. 6B illustrates a block diagram of an example of a vehicle, in accordance with some examples. As shown in FIG. 6B, the vehicle 100 (e.g., an aircraft) produced by method 600 includes airframe 618 with plurality of systems 620, and interior 622. Examples of systems 620 include one or more of propulsion system 624, electrical system 626, hydraulic system 628, and environmental system 630. In various examples, other systems are also included within vehicle 100. Although an aerospace example is shown, the principles of the embodiments disclosed herein is applicable to other industries, such as the automotive industry.

Further Examples

Further, the disclosure includes examples according to the following clauses:

Clause 1. A composite structure 200 comprising:
a composite laminate 214, comprising a first laminate surface 240, a second laminate surface 242, and a plurality of fiber tows 204 disposed between the first laminate surface 240 and the second laminate surface 242,
wherein each of the plurality of fiber tows 204 comprises a plurality of fiber strands 218 and a resin 206,
wherein the resin 206 is disposed within a first portion 210 of each of the plurality of fiber tows 204,
wherein each of the plurality of fiber tows 204 is disposed proximate to a different one of the plurality of fiber tows 204, and
wherein the resin 206 has a first viscosity within a first temperature range; and
an infusion film 202, disposed on the first laminate surface 240 of the plurality of fiber tows 204,
wherein the infusion film 202 has a second viscosity that is lower than the first viscosity of the resin 206 within the first temperature range, and
wherein the infusion film 202 is configured to flow into the composite laminate 214 when the infusion film 202 is within the first temperature range.

Clause 2. The composite structure 200 of clause 1, wherein the composite laminate 214 further comprises a void 212, disposed between the plurality of fiber tows 204, and wherein the infusion film 202 is configured to flow into the void 212 when the infusion film 202 is within the first temperature range.

Clause 3. The composite structure 200 of any one of clauses 1 or 2, wherein the first portion 210 is an outer portion of each of the plurality of fiber tows 204.

Clause 4. The composite structure 200 of clause 3, wherein the plurality of fiber tows 204 each further comprise a second portion 208 free of the resin 206.

Clause 5. The composite structure 200 of clause 4, wherein the resin 206 is configured to migrate into the second portion 208 when in a second temperature range greater than the first temperature range.

Clause 6. The composite structure 200 of clause 4, wherein the second portion 208 is a center portion of the plurality of fiber tows 204.

Clause 7. The composite structure 200 of any one of clauses 1-6, wherein the infusion film 202 is a first infusion film 202A and the composite structure 200 further comprises:
a second infusion film 202B, disposed on the second laminate surface 242, wherein the second infusion film 202B has the second viscosity that is lower than the first viscosity of the resin 206 within the first temperature range and is configured to flow into the composite laminate 214 when the second infusion film 202 is within the first temperature range, and wherein the second laminate surface 242 is opposite of the first laminate surface 240.

Clause 8. The composite structure 200 of any one of clauses 1-7, wherein the composite laminate 214 is a first composite laminate 214A comprising a first plurality of fiber tows 204, and wherein the composite structure 200 further comprises:
a second composite laminate 214B comprising a second plurality of fiber tows 204, wherein the infusion film 202 is disposed between the first composite laminate 214A and the second composite laminate 214B.

Clause 9. The composite structure 200 of any one of clauses 1-8, wherein the composite structure 200 is configured to be coupled to a portion of an aircraft 100.

Clause 10. A composite structure 200 comprising:
a first composite laminate 214A;
a second composite laminate 214B, wherein each of the first composite laminate 214A and the second composite laminate 214B comprises a plurality of fiber tows 204,
wherein each of the plurality of fiber tows 204 comprises a plurality of fiber strands 218 and a resin 206,
wherein the resin 206 is disposed within a first portion 210 of each of the plurality of fiber tows 204,
wherein each of the plurality of fiber tows 204 is disposed proximate to a different one of the plurality of fiber tows 204, and
wherein the resin 206 has a first viscosity within a first temperature range; and
an infusion film 202, disposed between the first composite laminate 214A and the second composite laminate 214B,
wherein the infusion film 202 has a second viscosity that is lower than the first viscosity of the resin 206 within the first temperature range, and
wherein the infusion film 202 is configured to flow into the first composite laminate 214A, the second composite laminate 214B, or both when the infusion film 202 is within the first temperature range.

Clause 11. A method 400 comprising:
disposing 406 a vacuum bag 320 around a composite structure 200, the composite structure 200 comprising:
a composite laminate 214, comprising a first laminate surface 240, a second laminate surface 242, and a plurality of fiber tows 204 disposed between the first laminate surface 240 and the second laminate surface 242,
wherein each of the plurality of fiber tows 204 comprises a plurality of fiber strands 218 and a resin 206,
wherein the resin 206 is disposed within a first portion 210 of each of the plurality of fiber tows 204, and
wherein the resin 206 has a first viscosity within a first temperature range; and
an infusion film 202, disposed on the first laminate surface 240 of the plurality of fiber tows 204,
wherein the infusion film 202 has a second viscosity that is lower than the first viscosity of the resin 206 within the first temperature range, and
wherein the infusion film 202 is configured to flow into the composite laminate 214 when the infusion film 202 is within the first temperature range;
reducing pressure 408 inside the vacuum bag 320 to provide a compressive force on the composite structure 200; and
heating the composite structure 200 to a first temperature range to flow 410 the infusion film 202 into the composite laminate 214.

Clause 12. The method of clause 11, further comprising:
filling 414 a void 212 within the composite laminate 214 with the infusion film 202.

Clause 13. The method of any one of clauses 11 or 12, further comprising:
heating the composite structure 200 to a second temperature range to migrate 412 the resin 206 into a second portion 208 of the fiber tows 204.

Clause 14. The method of clause 13, wherein the second portion 208 is a center portion of the fiber tows 204.

Clause 15. The method of clause 13, wherein the migrating 412 of the resin 206 into the second portion 208 displaces air from the second portion 208.

Clause 16. The method of clause 13, wherein the migrating 412 of the resin 206 into the second portion 208 further flows the infusion film 202 into the composite laminate 214.

Clause 17. The method of any one of clauses 11-16, further comprising:
laying up 402 the composite laminate 214.

Clause 18. The method of any one of clauses 11-17, further comprising:
applying 404 the infusion film 202A to the first laminate surface 240.

Clause 19. The method of clause 18, further comprising:
applying 404 the infusion film 202B to the second laminate surface 242.

Clause 20. The method of claim any one of clauses 11-19, further comprising:
coupling the composite structure 200 to a portion of an aircraft 100.

CONCLUSION

Although foregoing concepts have been described in some detail for purposes of clarity of understanding, it will be apparent that certain changes and modifications may be practiced within scope of appended claims. It should be noted that there are many alternative ways of implementing processes, systems, and apparatuses. Accordingly, present examples are to be considered as illustrative and not restrictive.

The invention claimed is:

1. A composite structure comprising:
a composite laminate, comprising a first laminate surface, a second laminate surface, and a plurality of fiber tows disposed between the first laminate surface and the second laminate surface,
wherein each of the plurality of fiber tows comprises a plurality of fiber strands and a resin,
wherein each of the plurality of fiber tows comprises a first portion and a second portion,
wherein the resin is disposed within the first portion of each of the plurality of fiber tows and the second portion of each of the plurality of fiber tows is free of resin,
wherein each of the plurality of fiber tows is disposed proximate to a different one of the plurality of fiber tows,
wherein the resin has a first viscosity within a first temperature range and is configured to not flow into the second portion when in the first temperature range, and
wherein the resin is configured to flow into the second portion when in a second temperature range greater than the first temperature range; and
an infusion film, disposed on the first laminate surface of the composite laminate,
wherein the infusion film has a second viscosity that is lower than the first viscosity of the resin within the first temperature range, and
wherein the infusion film is configured to flow into the composite laminate when the infusion film is within the first temperature range.

2. The composite structure of claim 1, wherein the composite laminate further comprises a void, disposed between the plurality of fiber tows, and wherein the infusion film is configured to flow into the void when the infusion film is within the first temperature range.

3. The composite structure of claim 1, wherein the first portion is an outer portion of each of the plurality of fiber tows.

4. The composite structure of claim 1, wherein the first laminate surface is an upper surface of the composite laminate.

5. The composite structure of claim 1, wherein the infusion film is further configured to migrate into one or more voids created by the resin flowing into the second portion when in the second temperature range.

6. The composite structure of claim 1, wherein the second portion is a center portion of the plurality of fiber tows.

7. The composite structure of claim 1, wherein the infusion film is a first infusion film and the composite structure further comprises:
a second infusion film, disposed on the second laminate surface, wherein the second infusion film has the second viscosity that is lower than the first viscosity of the resin within the first temperature range and is configured to flow into the composite laminate when the second infusion film is within the first temperature range, and wherein the second laminate surface is opposite of the first laminate surface.

8. The composite structure of claim 1, wherein the composite laminate is a first composite laminate comprising a first plurality of fiber tows, and wherein the composite structure further comprises:

a second composite laminate comprising a second plurality of fiber tows, wherein the infusion film is disposed between the first composite laminate and the second composite laminate.

9. The composite structure of claim 1, wherein the composite structure is configured to be coupled to a portion of an aircraft.

10. A composite structure comprising:
a first composite laminate;
a second composite laminate, wherein each of the first composite laminate and the second composite laminate comprises a plurality of fiber tows,
   wherein each of the plurality of fiber tows comprises a plurality of fiber strands and a resin,
   wherein each of the plurality of fiber tows comprises a first portion and a second portion,
   wherein the resin is disposed within the first portion of each of the plurality of fiber tows and the second portion of each of the plurality of fiber tows is free of resin,
   wherein each of the plurality of fiber tows is disposed proximate to a different one of the plurality of fiber tows,
   wherein the resin has a first viscosity within a first temperature range and is configured to not flow into the second portion when in the first temperature range, and
   wherein the resin is configured to flow into the second portion when in a second temperature range greater than the first temperature range; and
an infusion film, disposed between the first composite laminate and the second composite laminate,
   wherein the infusion film has a second viscosity that is lower than the first viscosity of the resin within the first temperature range, and
   wherein the infusion film is configured to flow into the first composite laminate, the second composite laminate, or both when the infusion film is within the first temperature range.

11. A method comprising:
disposing a vacuum bag around a composite structure, the composite structure comprising:
   a composite laminate, comprising a first laminate surface, a second laminate surface, and a plurality of fiber tows disposed between the first laminate surface and the second laminate surface,
      wherein each of the plurality of fiber tows comprises a plurality of fiber strands and a resin,
      wherein each of the plurality of fiber tows comprises a first portion and a second portion,
      wherein the resin is disposed within the first portion of each of the plurality of fiber tows and the second portion of each of the plurality of fiber tows is free of resin,
      wherein each of the plurality of fiber tows is disposed proximate to a different one of the plurality of fiber tows,
      wherein the resin has a first viscosity within a first temperature range and is configured to not flow into the second portion when in the first temperature range, and
      wherein the resin is configured to flow into the second portion when in a second temperature range greater than the first temperature range; and
   an infusion film, disposed on the first laminate surface of the composite laminate,
      wherein the infusion film has a second viscosity that is lower than the first viscosity of the resin within the first temperature range, and
      wherein the infusion film is configured to flow into the composite laminate when the infusion film is within the first temperature range;
reducing pressure inside the vacuum bag to provide a compressive force on the composite structure; and
heating the composite structure to the first temperature range to flow the infusion film into the composite laminate.

12. The method of claim 11, further comprising:
filling a void within the composite laminate with the infusion film.

13. The method of claim 11, further comprising:
heating the composite structure to the second temperature range to migrate the resin into the second portion of the fiber tows.

14. The method of claim 11, wherein the second portion is a center portion of the fiber tows.

15. The method of claim 13, wherein the migrating of the resin into the second portion displaces air from the second portion.

16. The method of claim 13, wherein the migrating of the resin into the second portion further flows the infusion film into the composite laminate.

17. The method of claim 11, further comprising:
laying up the composite laminate.

18. The method of claim 11, further comprising:
applying the infusion film to the first laminate surface; and
applying the infusion film to the second laminate surface.

19. The method of claim 18, wherein the reducing the pressure and the heating the composite structure are performed out of autoclave.

20. The method of claim 11, further comprising:
coupling the composite structure to a portion of an aircraft.

* * * * *